United States Patent
Leddige et al.

(10) Patent No.: US 6,477,614 B1
(45) Date of Patent: Nov. 5, 2002

(54) METHOD FOR IMPLEMENTING MULTIPLE MEMORY BUSES ON A MEMORY MODULE

(75) Inventors: Michael W. Leddige, Beaverton; Bryce D. Horine, Aloha; Randy Bonella, Portland; Peter D. MacWilliams, Aloha, all of OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 09/658,293

(22) Filed: Sep. 8, 2000

Related U.S. Application Data

(62) Division of application No. 09/163,860, filed on Sep. 30, 1998.

(51) Int. Cl.[7] ............................. G06F 12/06; G06F 9/00
(52) U.S. Cl. .......................... 711/5; 711/115; 711/170; 710/131; 714/56
(58) Field of Search ............................. 711/5, 115, 170; 710/131; 714/56

(56) References Cited

U.S. PATENT DOCUMENTS

| | | | |
|---|---|---|---|
| 5,590,299 A | * 12/1996 | Bennett | 711/5 |
| 5,860,080 A | * 1/1999 | James et al. | 711/4 |
| 6,006,275 A | 12/1999 | Picazo, Jr. et al. | |
| 6,073,251 A | * 6/2000 | Jewett et al. | 714/7 |
| 6,240,526 B1 | * 5/2001 | Petivan et al. | 714/11 |

* cited by examiner

*Primary Examiner*—Matthew Kim
*Assistant Examiner*—Pierre M. Vital
(74) *Attorney, Agent, or Firm*—Blakely, Sokoloff, Taylor & Zafman LLP

(57) ABSTRACT

A computer system memory module includes a bi-directional repeater hub that in a first direction takes as an input a memory bus signal in a first port, regenerates the memory signals, and outputs the regenerated memory signal at a second port as at least one separate signal for coupling to a memory bus for each of the regenerated separate signals. In a second direction, the bi-directional repeater hub takes as input at least one memory bus signal at the second port, regenerates each input memory bus signal, and outputs the regenerated memory signal at the first port for coupling to a memory bus. A method includes determining whether a memory device to which signals are addressed is on a first memory module. Signals are routed to a first memory bus on the first memory module connected to the memory device if the memory is on the first memory module. Signals are routed to a second memory bus on a second memory module if the memory device is not on the first memory module.

22 Claims, 8 Drawing Sheets

METHOD FOR IMPLEMENTING MULTIPLE MEMORY BUSES ON A MEMORY MODULE

This is a division of application Ser. No. 09/163,860, filed Sep. 30, 1998.

FIELD OF THE INVENTION

The present invention relates to memory systems in computer systems. More specifically, the present invention relates to a method and apparatus for implementing multiple memory buses on a memory module.

BACKGROUND OF THE INVENTION

Memory modules such as the Dual In-Line Memory Module (DIMM) have become a popular memory packaging design. DIMMs are small printed circuit boards mounted with a plurality of memory devices. The more widely used DIMMs have 168 pins and can transfer 64 bits at a time. DIMMs have leads accessible via both sides of a printed circuit board's electrical connector unlike its predecessor, the Single In-Line Memory Module (SIMM), which has leads on only one side of the printed circuit board's electrical connector. DIMMs are inserted into small socket connectors that are soldered onto a larger printed circuit board, or motherboard. Because DIMMs are socketed, they are inherently replaceable and upgradable. The DIMMs are typically connected in parallel to a memory controller via a single memory bus. The memory controller coordinates movement of data between memory devices on the DIMMs and the other components on the computer system via the single memory bus.

One drawback to memory systems implementing memory modules was that the memory systems were limited to the number of memory devices that may be connected to the memory bus. Thus, regardless of the number of memory devices that were mountable on a memory module and the number of socket connectors that were mountable on a motherboard, the capacity of the memory system was limited by the constraint imposed by the memory bus.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
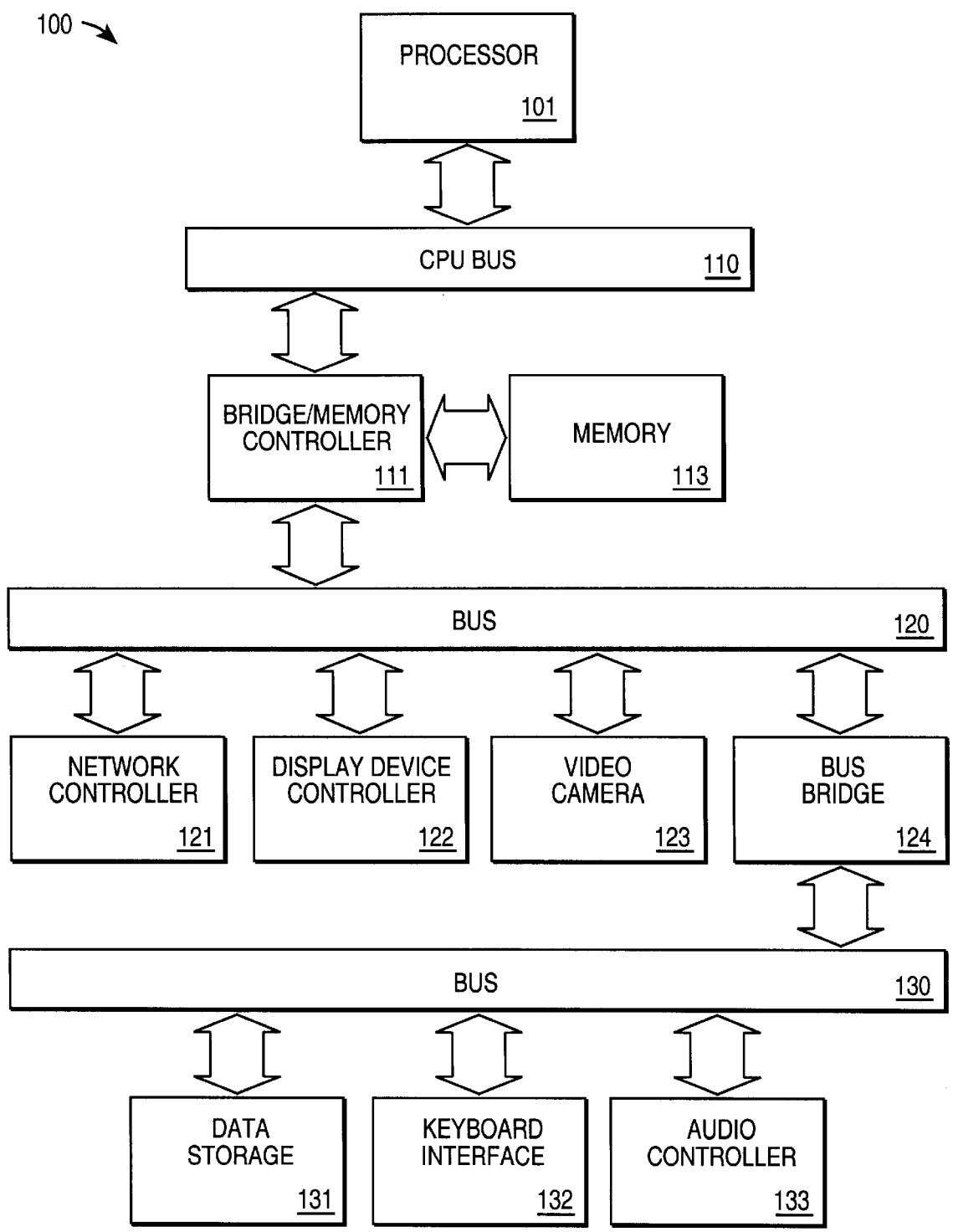
FIG. 1 is a block diagram of a computer system implementing an embodiment of the present invention.

FIG. 1 illustrates a computer system 100 upon which an embodiment of the present invention can be implemented. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a synchronous direct random access memory (SDRAM) device, or other memory device. The memory 113 may store instructions and code represented by data signals that may be executed by the processor 101. According to an embodiment of the computer system 100, the memory 113 comprises a memory system having a plurality of memory modules. Each of the memory modules comprises a printed circuit board having a plurality of memory devices mounted on the printed circuit board. The printed circuit board operates as a daughter card insertable into a socket connector that is connected to the computer system 100.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device controller 122 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard (not shown) to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

Figure 2:
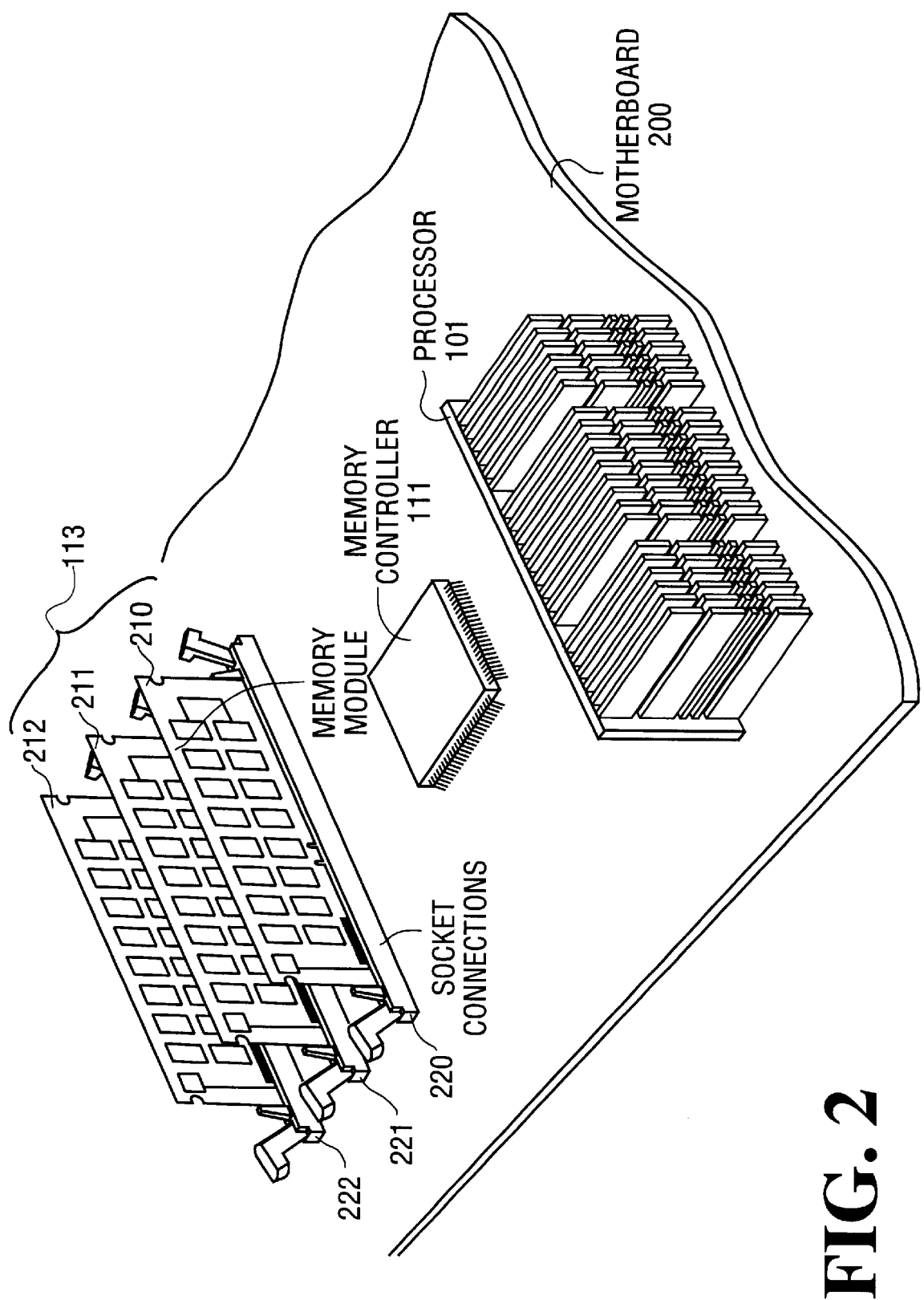
FIG. 2 illustrates a memory system mounted on a motherboard according to an embodiment of the present invention.

FIG. 2 illustrates a memory system 113 according to an embodiment of the present invention. The memory system 113 resides on a motherboard 200 of the computer system 100. The motherboard 200 is a printed circuit board that interconnects components of the computer system 100 such as the bridge memory controller 111, the processor 101 and other components. The memory system 113 includes a plurality of memory modules 210–212. Each of the memory modules includes a plurality of memory devices mounted on the memory module. The memory system also includes a plurality of socket connectors 220–222 mounted on the motherboard 200. The memory modules 210–212 are insertable into the socket connectors 220–222. Electrical connectors on the memory module interface with electrical contacts in the socket connector. The electrical connectors and the electrical contacts allow components on the motherboard 200 to access the memory devices on the memory module. It should be appreciated that any number of socket connectors may be mounted on the motherboard to receive any number of memory modules. It should also be appreciated that any number of memory devices may be mounted on each memory module. The memory system 113 may be implemented in a computer system which partitions I/O structures differently than the one illustrated in FIG. 1.

Figure 3:
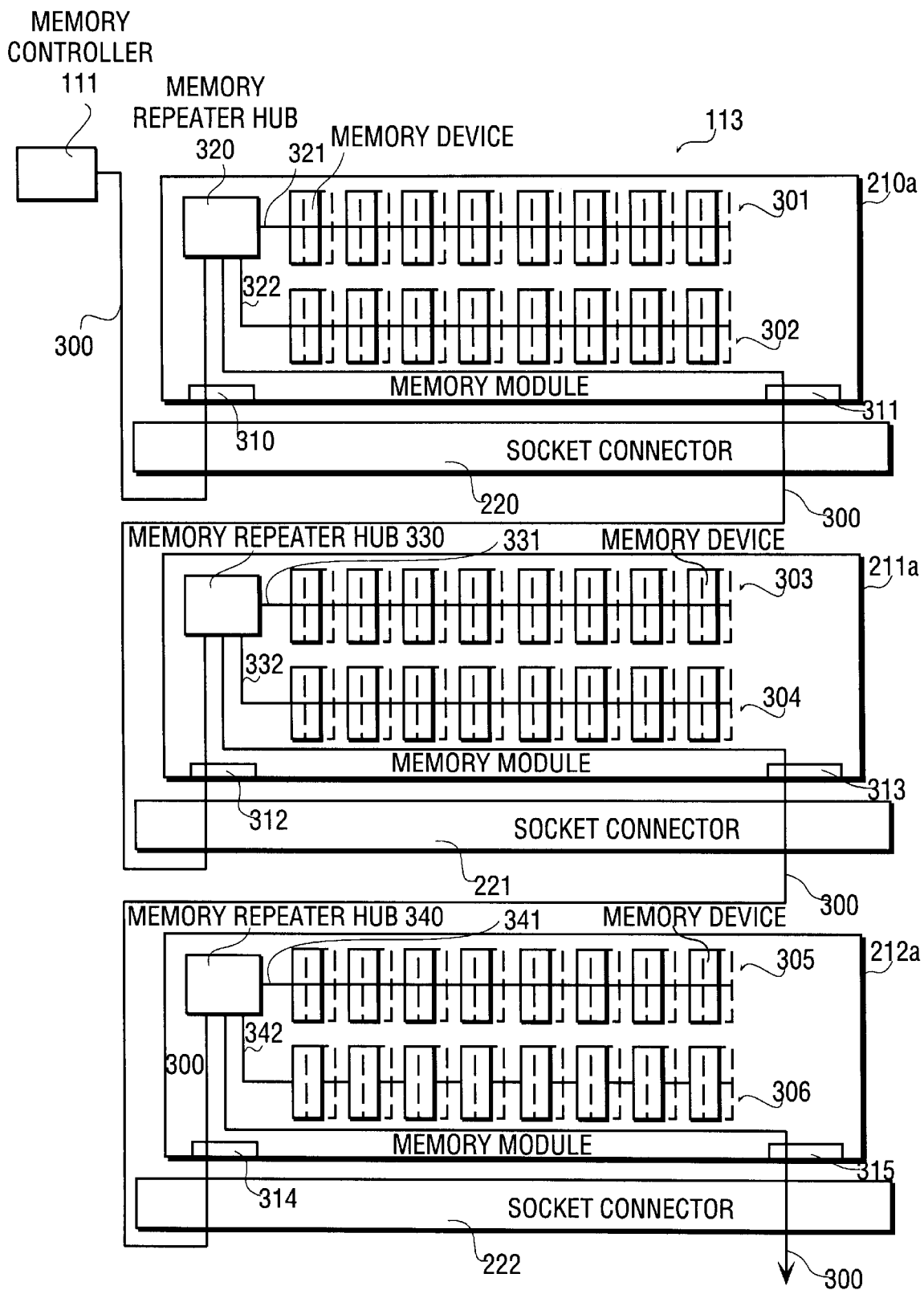
FIG. 3 illustrates a bus routing and wiring topology for a memory system according to a first embodiment of the present invention.

FIG. 3 illustrates a bus routing and wiring topology for the memory system 113 according to a first embodiment of the present invention. The bus routing and wiring topology of the memory system 113 allows memory devices in the system to have equal latency. A first memory bus 300 couples the bridge memory controller 111 to the memory system 113. The first memory bus 300 is a serial bus that is serially routed from the bridge memory controller 111 to the first socket connectors 220. The first memory bus 300 is routed from the first socket connector 220 to a first electrical connector 310 on the first memory module 210a. The memory bus 300 is routed from the first electrical connector 310 to a first memory repeater hub 320 that is coupled to a second memory bus 321 and a third memory bus 322. The second memory bus 321 and the third memory bus 322 are coupled in parallel with respect to each other and are connected in series with the first memory bus 300 via the first memory repeater hub 320. The first, second, and third memory buses 300, and 321–322 are defined such that a limited number of memory devices may be coupled to each bus. Coupling additional memory buses to the first memory bus 300 via the first memory repeater hub 320 allows additional memory devices to be added to the memory system 113 beyond the limitations of a single memory bus. As shown in FIG. 3, a first plurality of memory devices 301 are connected in series on the first memory module 210a via the second memory bus 321 and a second plurality of memory devices 302 are connected in series on the first memory module 210a via the third memory bus 322. The first memory bus 300 is routed off of the first memory module 210a via the electrical connector 311 and back to the first socket connector 220 and onto the second socket connector 221.

The first memory bus 300 is routed from the second socket connector 221 onto a first electrical connector 312 on the second memory module 211a. The first memory bus 300 is routed from the first electrical connector 312 to a second memory repeater hub 330 that is coupled to a fourth memory bus 331 and a fifth memory bus 332. The fourth memory bus 331 and the fifth memory bus 332 are coupled in parallel with respect to each other and are both connected in series with the first memory bus 300 via the second memory hub repeater 330. The fourth and fifth memory buses 331–332 are defined similarly to the first memory bus 300 in that a limited number of memory devices may be coupled to each bus. Coupling additional memory buses to the first memory bus 300 via the second memory repeater hub 330 allows additional memory devices to be added to the memory system 113 beyond the limitations of a single bus. As shown in FIG. 3, a third plurality of memory devices 303 and a fourth plurality of memory devices 304 are connected in series on the second memory module 211a via the fourth and fifth memory buses 331 and 332, respectfully. The first memory bus 300 is routed off of the second memory module 21 1a via the electrical connector 313 and back to the second socket connector 221 and onto the third socket connector 222.

The first memory bus 300 is routed from the third socket connector 222 onto a first electrical connector 314 on the third memory module 212a. The first memory bus 300 is routed to a third memory hub repeater 340 that is coupled to a sixth memory bus 341 and seventh memory bus 342. The sixth memory bus 341 and seventh memory bus 342 are coupled in parallel with respect to each other and are both connected in series with the first memory bus 300 via the third memory hub repeater 340. The sixth and seventh memory buses 341–342 are defined similarly to the first memory bus 300 in that a limited number of memory devices may be coupled to them. Coupling additional memory buses to the first memory bus 300 via the third memory repeater hub 340 allows additional memory devices to be added to the memory system 113 beyond the limitations of a single memory bus. As shown in FIG. 3, the sixth memory bus 341 serially connects a fifth plurality of memory devices 305 and the seventh memory bus 342 serial connects a sixth plurality of memory devices 306 on the third memory module 212a. The first memory bus 300 is routed off of the third memory module 212a via the electrical connector 415 and the socket connector 222. The first memory bus 300 may be connected to additional socket connectors added to the memory system 113 for adding additional memory modules with additional memory devices.

FIG. 3 illustrates a single memory repeater hub coupled to each memory module. The memory repeater hub connects a single memory bus to additional memory buses on each memory module. It should be appreciated, however, that any number of memory repeater hubs may be implemented on a memory module to connect any number of additional memory buses to an existing memory bus for adding any number of memory devices.

Figure 4:
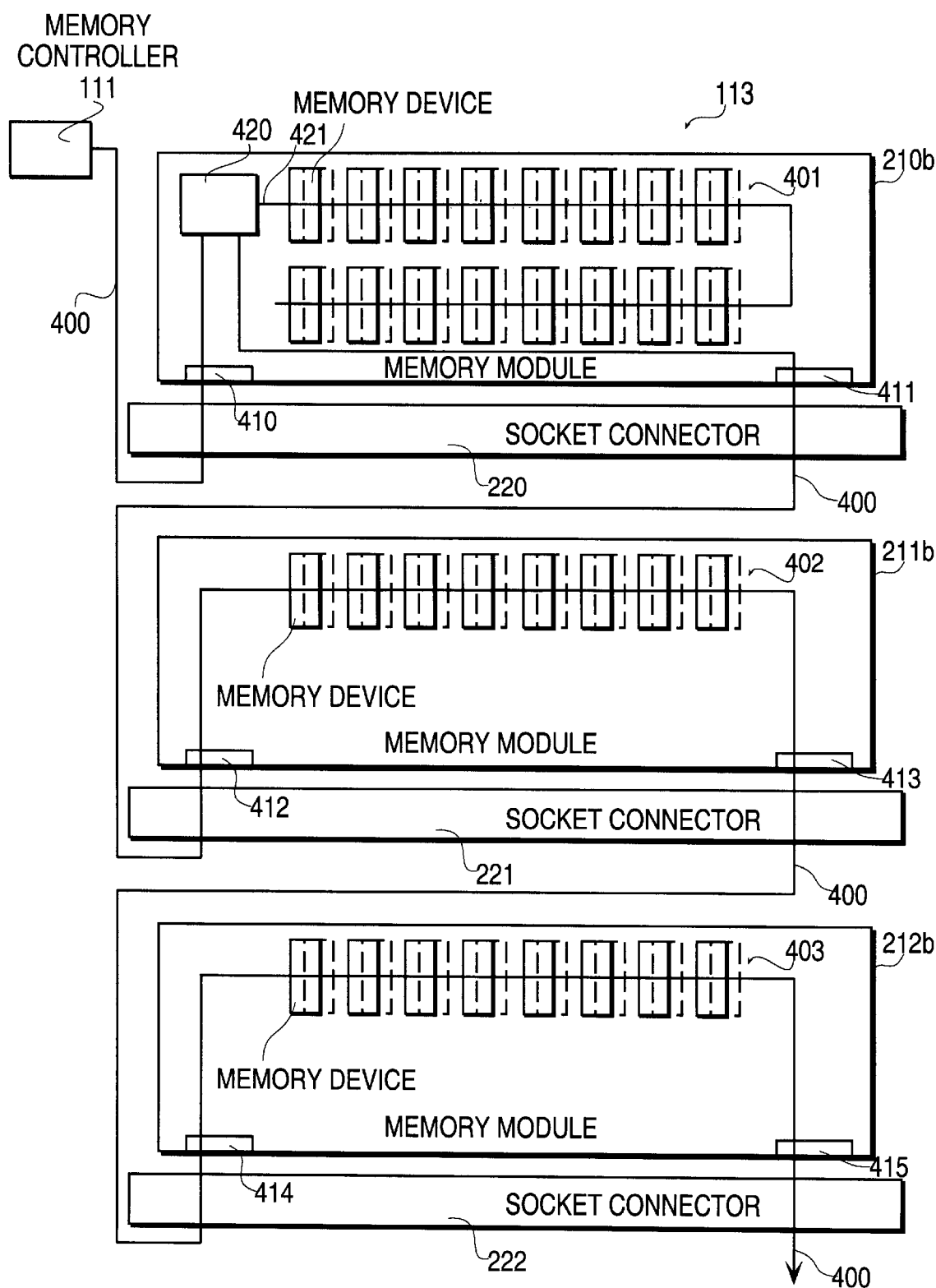
FIG. 4 illustrates a bus routing and wiring topology for a memory system according to a second embodiment of the present invention.

FIG. 4 illustrates a bus routing and wiring topology for the memory system 113 according to a second embodiment of the present invention. The bus routing and wiring topology of the memory system 113 allows the memory devices in the system to have equal latency. A first memory bus 400 couples the bridge memory controller 111 to the memory system 113. The first memory bus 400 is a serial bus that is serially routed from the bridge memory controller 111 to the first socket connectors 220. The first memory bus 400 is routed from the first socket connector 220 to a first electrical connector 410 on the first memory module 210b. The first memory bus 400 is routed from the first electrical connector 410 to a first memory repeater hub 420 that is coupled to a second memory bus. The second memory bus 421 is coupled in series with the first memory bus 400 via the first memory repeater hub 420. The first and second memory buses 400 and 421 are defined such that a limited number of memory devices may be coupled to each bus. Coupling additional memory buses to the first memory bus 400 via the first memory repeater hub 420 allows additional memory devices to be added to the memory system 113 beyond the limitations of a single memory bus. As shown in FIG. 4, a plurality of memory devices 401 are connected in series on the first memory module 210b via the second memory bus 421. The first memory bus 400 is routed off of the first memory module 210b via the 20 electrical connector 411 and back to the first socket connector 220 and onto the second socket connector 221.

The first memory bus 400 is routed from the second socket connector 221 onto a first electrical connector 412 on the second memory module 211b. The first memory bus 400 is routed from the first electrical connector 412 to a second plurality of memory devices 402. The first memory bus 400 is routed off of the second memory module 211b via the electrical connector 413 and back to the second socket connector 221 and onto the third socket connector 222.

The first memory bus 400 is routed from the third socket connector 222 onto a first electrical connector 414 on the third memory module 212b. The first memory bus 400 is routed to a third plurality of memory devices 403. The first memory bus 400 is routed off of the third memory module 212b via the electrical connector 415 and the socket connector 222. The first memory bus 400 may be connected to additional socket connectors added to the memory system 113 for adding additional memory modules with additional memory devices.

FIG. 4 illustrates a single memory repeater hub coupled to the memory module 210b. The memory repeater hub 420 connects a single memory bus 400 to an additional memory bus 421 on the memory module 210b. It should be appreciated, however, that any number of memory repeater hubs may be implemented on a memory module to connect any number of additional memory buses to an existing memory bus for adding any number of memory devices.

Figure 5:
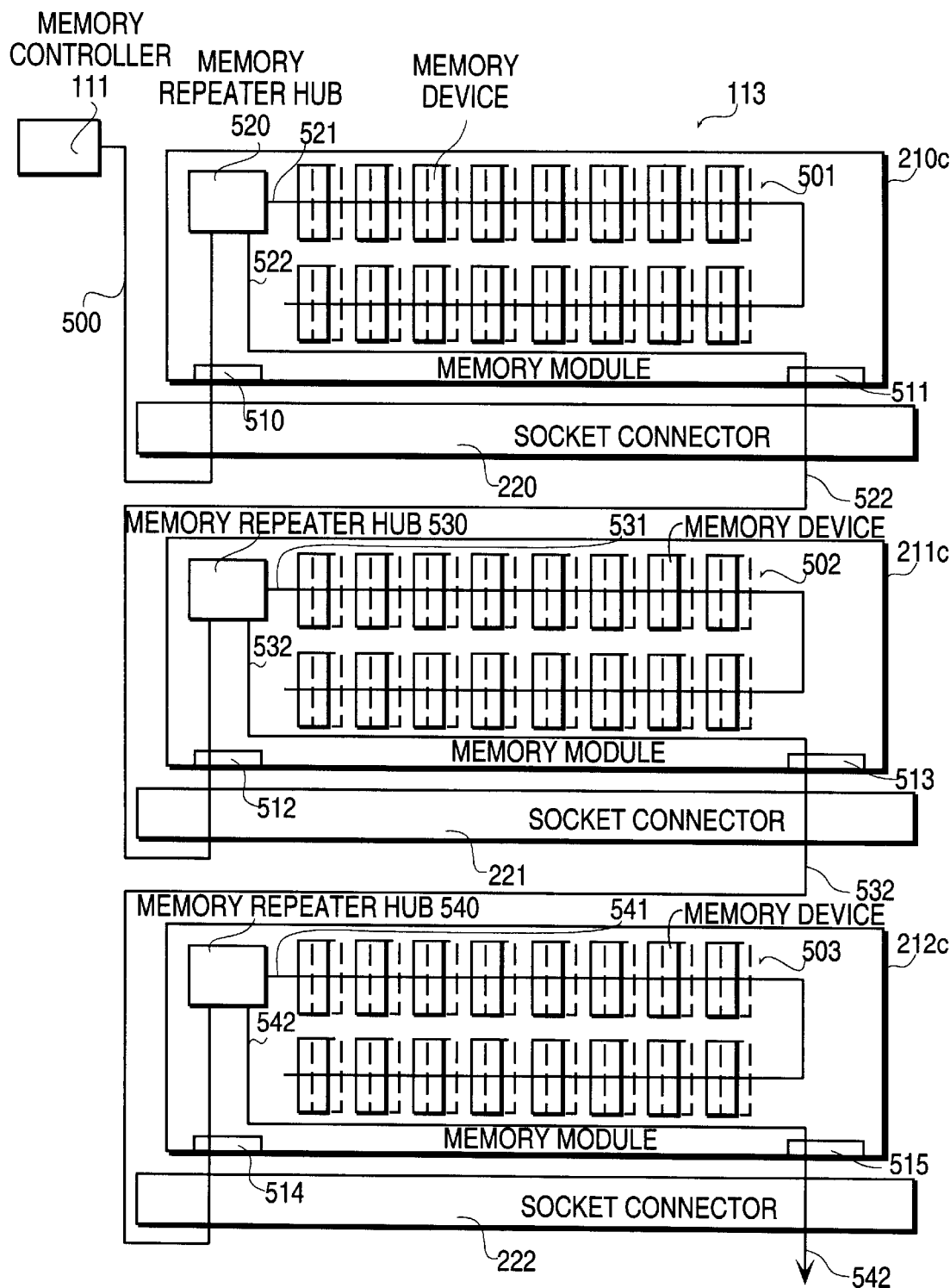
FIG. 5 illustrates a bus routing and wiring topology for a memory system according to a third embodiment of the present invention.

FIG. 5 illustrates a bus routing and wiring topology for the memory system 113 according to a third embodiment of the present invention. A first memory bus 500 couples the bridge memory controller 111 to the memory system 113. The first memory bus 500 is a serial bus that is serially routed from the bridge memory controller 111 to the first socket connectors 220. The first memory bus 500 is routed from the first socket connector 220 to a first electrical connector 510 on the first memory module 210c. The memory bus 500 is routed from the first electrical connector 510 to a first memory repeater hub 520 that is coupled to a second memory bus 521 and a third memory bus 522. The second memory bus 521 and the third memory bus 522 are coupled in parallel with respect to each other and are both connected in series with the first memory bus 500 via the first memory repeater hub 520. The first, second, and third memory buses 500, 521, and 522 are defined such that a limited number of memory devices may be coupled to each bus. Coupling additional memory buses to the first memory bus 500 via the first memory repeater hub 520 allows additional memory devices to be added to the memory system 113 beyond the limitations of a single memory bus. As shown in FIG. 5, a plurality of memory devices 501 are connected in series on the first memory module 210c via the second memory bus 521. The third memory bus 522 is routed off of the first memory module 210c via the electrical connector 511 and back to the first socket connector 220 and onto the second socket connector 221.

Similarly, the third memory bus 522 is routed from the second socket connector 221 onto a first electrical connector 512 on the second memory module 211c. The third memory bus 522 is routed from the first electrical connector 512 to a second memory repeater hub 530 that is coupled to a fourth memory bus 531 and a fifth memory bus 532. The fourth memory bus 531 and the fifth memory bus 532 are coupled in parallel with respect to each other and are both connected in series with the third memory bus 522 via the second memory hub repeater 530. The fourth and fifth memory buses 531 and 532 are defined similarly to the third memory bus 522 in that a limited number of memory devices may be coupled to each bus. Coupling additional memory buses to the third memory bus 522 via the second memory repeater hub 530 allows additional memory devices to be added to the memory system 113 beyond the limitations of a single bus. As shown in FIG. 5, an additional plurality of memory devices 502 are connected in series on the second memory module 211c via the fourth memory bus 531. The fifth memory bus 532 is routed off of the second memory module 211c via the electrical connector 513 and back to the second socket connector. 221 and onto the third socket connector 222.

Similarly, the fifth memory bus 532 is routed from the third socket connector 222 onto a first electrical connector 514 on the third memory module 212c. The fifth memory bus 532 is routed to a third memory hub repeater 540 that is coupled to a sixth memory bus 541 and a seventh memory bus 542. The sixth memory bus 541 and the seventh memory bus 542 are coupled in parallel with respect to each other and are both connected in series with the fifth memory bus 532 via the third memory hub repeater 540. The sixth memory bus 541 and the seventh memory bus 542 are defined similarly to the fifth memory bus 532 in that a limited number of memory devices may be coupled to them. Coupling additional memory buses to the fifth memory bus 532 via the third memory repeater hub 540 allows additional memory devices to be added to the memory system 113 beyond the limitations of a single memory bus. As shown in FIG. 5, the sixth memory bus 541 serially connects an additional plurality of memory devices 503 on the third memory module 212c. The seventh memory bus 542 is routed off of the third memory module 212c via the electrical connector 515 and the socket connector 222. The seventh memory bus 542 may be connected to additional socket connectors added to the memory system 113 for adding additional memory modules with additional memory devices.

FIG. 5 illustrates a single memory repeater hub coupled to each memory module.

The memory repeater hub connects a single memory bus to two additional memory buses on each memory module. It should be appreciated, however, that any number of memory repeater hubs may be implemented on a memory module to connect any number of additional memory buses to an existing memory bus for adding any number of memory devices.

Figure 6:
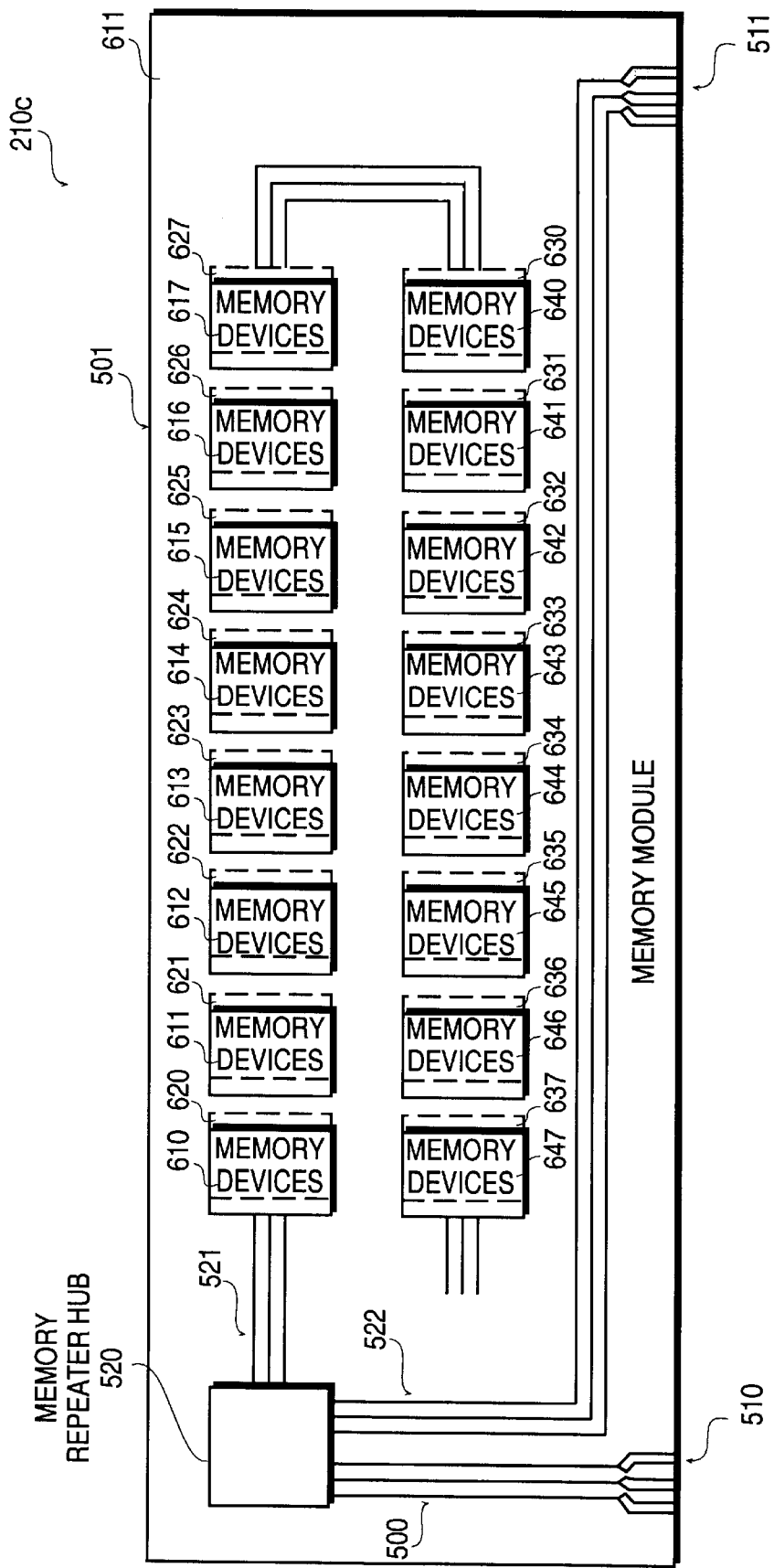
FIG. 6 illustrates an exemplary memory module according to an embodiment of the present invention.

FIG. 6 illustrates an exemplary embodiment of the first memory module 210c according to an embodiment of the present invention. The first memory bus 500 is routed from the first electrical connector 510 to the first memory repeater hub 520. The second memory bus 521 and the third memory bus 522 coupled in parallel with respect to each other and are both connected in series with the first memory bus 500 via to the first memory repeater hub 520.

The first memory module 210c includes a plurality of memory devices 501.

Memory devices 610–617 are mounted on a first row on a first side 611 of the first memory module 210c. Memory devices 620–627 are mounted on the first row on a second side (not shown) of the first memory module 210c. Memory devices 630–637 are mounted on a second row on the second side of the first memory module 210c. Memory devices 640–637 are mounted on the second row on the first side 611 of the memory module 210c. The second memory bus 521 is routed to each of the memory devices 610–617, 620–627, 630–637, and 640–647 connecting the memory devices 610–617, 620–627, 630–637, and 640–647 in series. Each memory device in a row is connected serially to a memory device on the opposite side of the first memory module 611. The memory device 627 is connected serially to the memory device 630.

According to an embodiment of the present invention, the first memory bus 500 transmits signals between the memory controller 111 (shown in FIGS. 1 and 2) and the first memory repeater hub 520. The first memory repeater hub 520 operates to determine whether signals received from the memory controller are to be transmitted to a memory device on the first memory module. If the signals are to be transmitted to a memory device on the first memory module, the first memory repeater hub 520 routes the signals to the appropriate memory device via the second memory bus 521. If the signals are to be transmitted to a memory device not on the first memory module, the first memory repeater hub 520 routes the signals off the first memory module via the third memory bus 522. It should be appreciated that the memory repeater hub may be used in an embodiment of a memory module having more than one memory bus with memory devices to determine the appropriate memory bus to route the signals. According to an embodiment of the present invention, the signals may be address, command (control), data, and clock signals.

According to an embodiment of the present invention, the memory devices 610–617, 620–627, 630–637, and 640–647 are SDRAM devices. It should be appreciated that any type of memory devices may be mounted on the first memory module 210c. The memory devices 610–617, 620–627, 630–637 and 640–647 may be packaged in a ball grid array (BGA), chip scale package (CSP), or other type of packaging.

Figure 7:
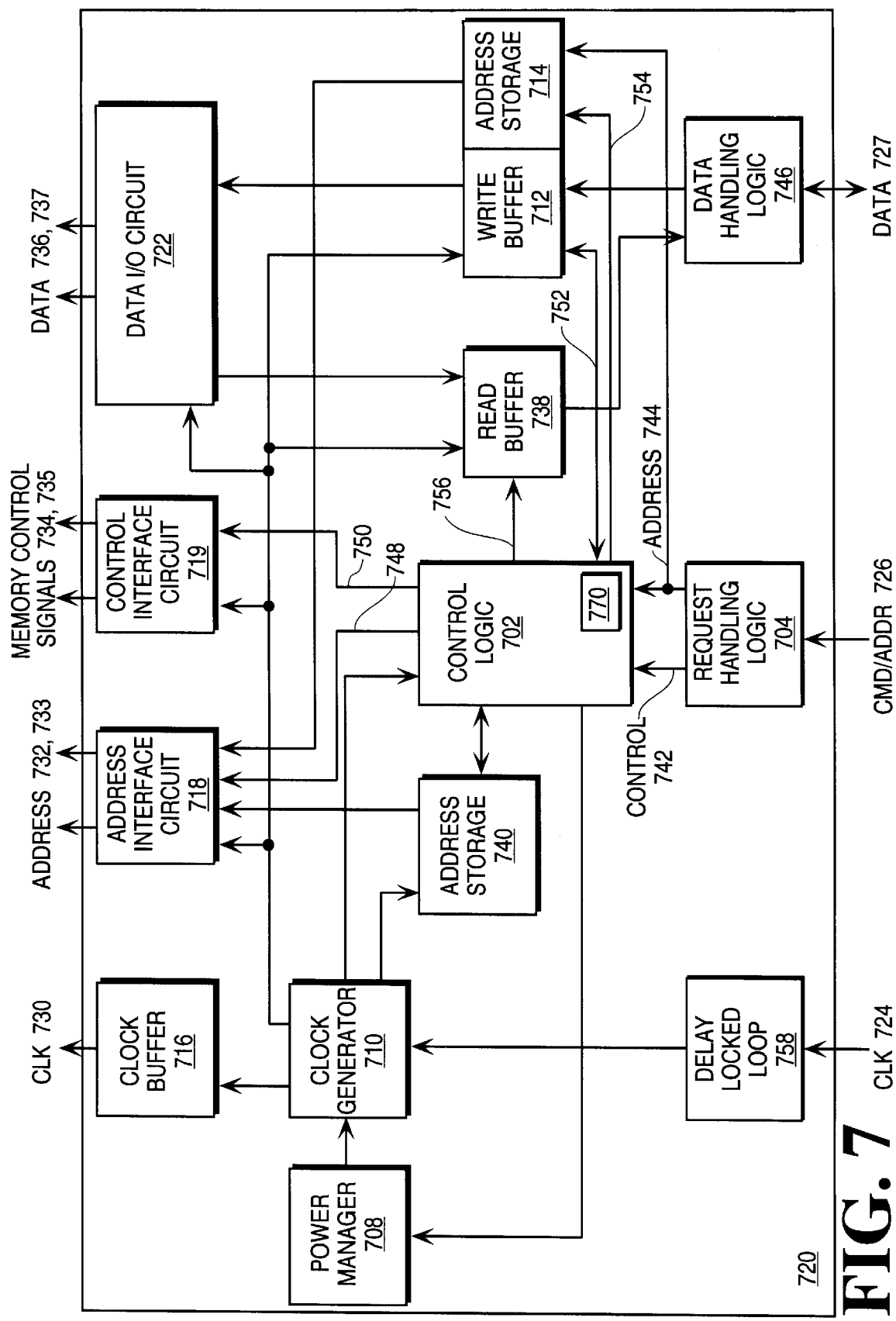
FIG. 7 illustrates a memory repeater hub according to an embodiment of the present invention.

FIG. 7 is a block diagram of a memory repeater hub 720 according to an embodiment of the present invention. According to one embodiment of the memory repeater hub 720, a demultiplexed protocol is used. It should be appreciated that other protocols may also be used. The memory repeater hub 720 interfaces with a first memory bus that may include a memory bus such as memory bus 300 (shown in FIG. 3), memory bus 400 (shown in FIG. 4), or memory bus 500 (shown in FIG. 5). The first memory bus includes one or more clock signal lines 724, a command and address bus CMD/ADDR 726, and data bus 727. The CMD/ADDR bus 726 may carry both address and control information for a memory transaction. Alternatively, CMD/ADDR bus 726 may be separated into separate command and address buses. The memory repeater hub 720 interfaces with the memory devices on a memory module by providing a clock signal 730, address signals 732 and 733, control signals 734 and 735, and data signals 736 and 737. The clock signal 730 may be omitted for a synchronous memory devices.

The memory repeater hub 720 includes request handling logic 704 that interfaces with the CMD/ADDR bus 726. The request handling logic 704 may include deserializing logic that may separate the multiplexed control and address information provided on the CMD/ADDR bus 726 and provide these signals to the control logic 702 via lines 742 and 744, respectively. The request handling logic 704 may also include serializing logic that may serialize control and address information on the lines 742 and 744, respectively, into a series of signals to be provided to the CMD/ADDR bus 726.

The memory repeater hub 720 further includes data handling logic 746 that may receive data from the data bus 727, reformat the data into a format appropriate for the memory devices on the memory module, and provide the reformatted data to write buffer 712. The data may be stored in the write buffer 712 until the data is provided to a memory device via data I/O circuitry 722. The data handling logic 746 may also receive data from the memory devices of the memory module via the data I/O circuitry 722 and/or read buffer 738. According to an embodiment of the present invention, the data handling logic 746 may be omitted and the formatting of data may be performed by the control logic 702.

The control logic 702 is the intelligence of the memory repeater hub 720. The control logic 702 provides appropriate control, address, and data signals to memory module devices on other memory buses on the memory module in response to address information received from the request handling logic 704. The control logic 702 may provide appropriate address signals to address interface circuit 718 via lines 748, control signals to control interface circuit 719 via lines 750, and data signals to data I/O circuit 722 by controlling write buffer 712 via line 752 and address storage 714 via lines 754. The control logic 702 may also provide the appropriate control signal to the read buffer 738 to control when data read from a memory device on the memory module is provided to the data handling logic. 746. The interface circuits 718,719, and 722 may include buffers and register elements to drive address lines 732 and 733, memory control lines 734 and 735, and data lines 736 and 737.

According to an embodiment of the memory repeater hub 720, the control logic 702 includes an addressing unit 770 that receives address information from the request handling logic 704 and determines where to direct the control, address, and data signals. The addressing unit 770 reads a first portion of the memory address to determine an identity of a memory devices that is to be accessed and reads a second portion of the address information to identify a memory bus which the memory device is on. From the first and second portions of address information, the addressing unit 770 determines whether the memory device is on the memory module. If the memory device is not on the memory module, the control logic 702 directs the address interface circuit 718, the control interface circuit 719, and the data I/O circuit 722 to forward the address information and corresponding control and data signals to alternate memory module via an alternate memory bus. If the memory device is on the memory module, the control logic 702 proceeds in directing the appropriate command and data signals to the memory device on a memory bus via the address interface circuit 718, the control interface circuit 719, and the data I/O circuit 722. According to an embodiment of the present invention, the first portion of the address information is a 5 bit value and the second portion of the address information is a 4 bit value.

The interface circuits 718, 719, and 722 may be clocked by a clock signal generated by clock generator 710. The clock generator 710 may also provide a clock signal to the control logic 702 and to clock buffers 716 that drive the clock signal 730 and/or clock enable signals to the memory devices on the memory module. The clock generator 710 may generate clock signals in response to the clock signal provided by the delay locked loop (DLL) 758. The DLL 758 may receive one or more clock signals 724 provided from the system memory bus 723. The clock 730 may operate at a frequency different than clock 724.

The memory repeater hub 720 may also include a power manager unit 708 that enables or disables the clock generator 710 under the direction of the control logic 702. This may, in turn, enable or disable the clock 730 or a clock enable signal provided to the memory devices on the memory module so as to control power dissipated by the memory devices. The memory repeater hub 720 may optionally include address storage unit 740 coupled to the control logic 702, address interface circuit 718, and clock generator 710. The address storage 740 may be used to store address information that may be provided from CMD/ADDR 726.

The control logic 702, addressing circuit 770, request handling logic 704, data handling logic 746, address interface circuit 718, control interface circuit 719, data I/O circuit 722, and power manager 708 may be implemented by any known technique or circuitry. According to an embodiment of the present invention, the control logic 702, addressing circuit 770, request handling logic 704, data handling logic 746, address interface circuit 718, control interface circuit 719, data I/O circuit 722, and power manager 708 are all implemented on a single semiconductor circuit.

Figure 8:
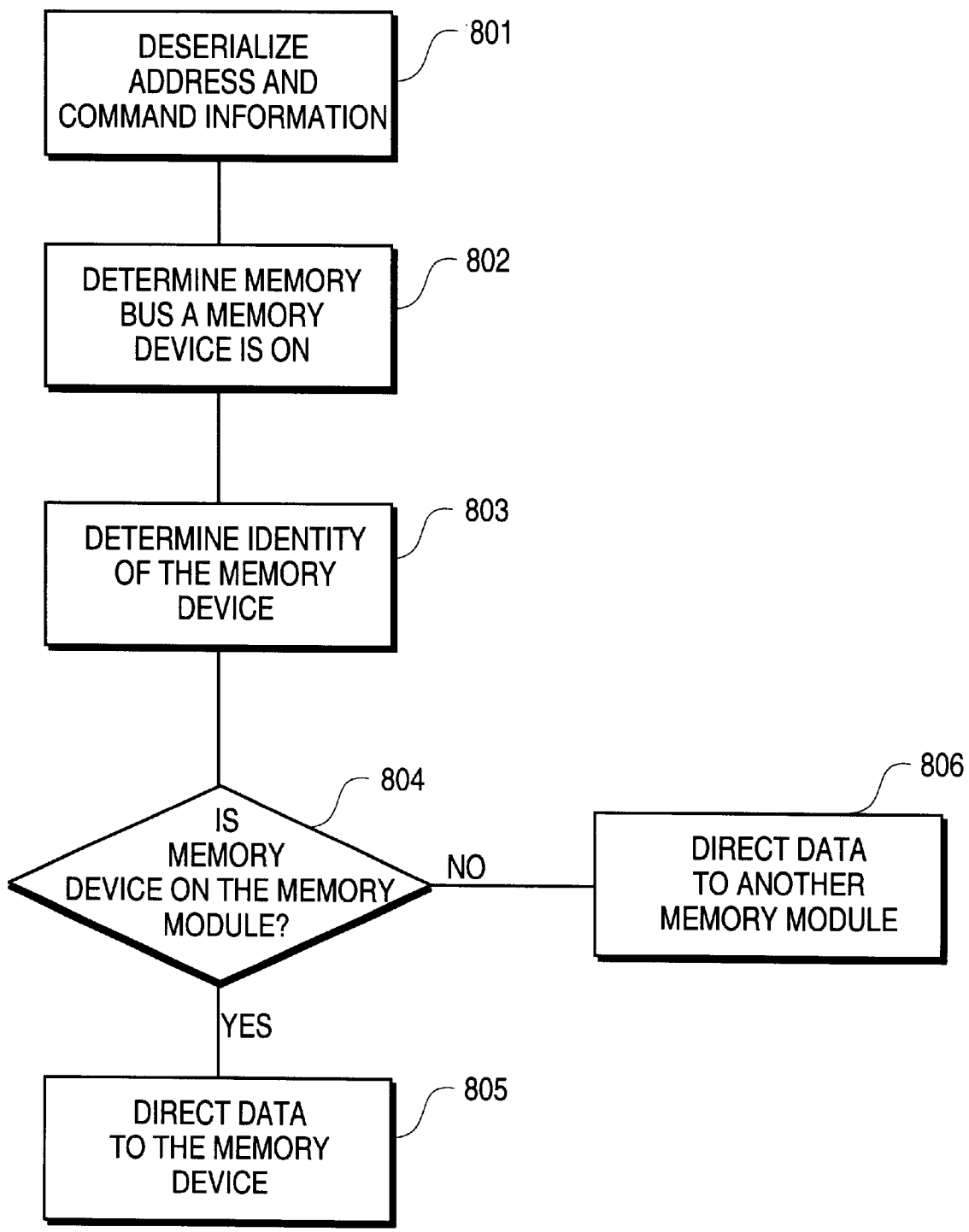
FIG. 8 is a flow chart illustrating a method for implementing multiple memory buses on a memory module according to an embodiment of the present invention.

FIG. 8 is a flow chart illustrating a method for directing data to a memory device according to an embodiment of the present invention. At step 801, address and command information is deserialized. According to an embodiment of the present invention, the address and command information is received on a CMD/ADDR bus.

At step 802, the memory bus in which a memory device that is to be accessed is determined. According to an embodiment of the present invention, a first portion of the address information is read to identify the identity of the memory bus.

At step 803, the identity of the memory device that is to be accessed is determined. According to an embodiment of the present invention, a second portion of the address information is read to identify the identity of the memory device.

At step 804, it is determined whether the memory device on the memory bus is on the present memory module. According to an embodiment of the present invention, an addressing unit includes memory module information regarding the identity of the memory buses and the memory devices on its memory module. The addressing unit compares the address information with the memory module information. If the memory device on the memory bus is on the present memory module, control proceeds to step 805. If the memory device on the memory bus is not on the present memory module, control proceeds to step 806.

At step 805, appropriate data is directed to the memory device on the memory bus on the present memory module. According to an embodiment of the present invention, the data is routed to the memory bus which the memory device is on.

At step 806, the address and command information is directed to a second memory module. According to an embodiment of the present invention, the data is routed to a second memory bus that is connected to the second memory module. The memory device may be on the second memory bus or a third memory bus.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A method for routing signals to a memory module having a memory repeater hub, comprising:
    determining, by a first memory repeater hub of the first memory module, whether the signals received address a memory device on a first memory module;
    routing the signals to a first memory bus on the first memory module connected to the memory device, if the addressed memory device is on the first memory module; and
    routing the signals to a second memory repeater hub of the second memory module that is connected to the first memory module, if the addressed memory device is not on the first memory module;
    determining, by the second memory repeater hub, whether the signals received address a memory device on the second memory module; and
    routing the signals to a second memory bus on the second memory module connected to the memory device, if the addressed memory device is on the second memory module.

2. The method of claim 1, further comprising routing the signals to a third memory repeater hub of the third memory module connected to the second memory module, if the addressed memory device is not on the second memory module.

3. The method of claim 1, wherein the first memory module further comprises a fourth memory bus connected in series with the first memory bus via the first memory repeater hub, and wherein the first and the third memory buses are coupled in parallel with respect to each other.

4. The method of claim 3, further comprising:
    determining whether the addressed memory device is on the first or the fourth memory bus;
    routing the signals to the first memory bus if the addressed memory device is on the first memory bus; and
    routing the signals to the fourth memory bus if the addressed memory device is on the fourth memory bus.

5. The method of claim 1, further comprising de-serializing command and address information from the signals, wherein the determination is performed based on the address information.

6. The method of claim 1, further comprising reformatting data into a format appropriate for a memory device of the memory module.

7. A method for routing signals on a memory module, comprising:
- determining, by a memory repeater hub coupled to the memory module, whether signals received address a memory device on the memory module;
- routing the signals to a first memory bus on the memory module connected to the memory device if the addressed memory device is on the memory module; and
- routing the signals to a second memory bus that is connected to the memory module if the addressed memory device is not on the memory module.

8. The method of claim 7, wherein the determining whether a memory device to which signals are addressed is on the first memory module, comprises:
- reading a first portion of address information to identify the identity of the memory device;
- reading a second portion of the address information to identify the identity of a memory bus that the memory device is connected to; and
- comparing the identity of the memory device and the identity of the memory bus to first memory module information.

9. The method of claim 7, wherein a de-multiplexed protocol is utilized in the memory repeater hub.

10. A method for routing signals to memory modules, comprising:
- de-serializing command and address information from the signals;
- determining whether the signals received address a memory device on a first memory module, based on the address information;
- routing the signals to a first memory bus on the first memory module coupled to the memory device, if the addressed memory device is on the first memory module; and
- routing the signals to a second memory bus that is connected to the first memory module, if the addressed memory device is not on the first memory module.

11. The method of claim 10, wherein determining whether the signals received address a memory device on the first memory module, comprises:
- reading a first portion of the address information to identify the identity of the memory device;
- reading a second portion of the address information to identify the identity of a memory bus that the memory device is connected to; and
- comparing the identity of the memory device and the identity of the memory bus to memory module information.

12. The method of claim 10, wherein the determination is performed by a memory repeater hub.

13. The method of claim 12, wherein a de-multiplexed protocol is utilized in the memory repeater hub.

14. The method of claim 10, wherein the first memory module and the second memory module are connected through an electrical connector.

15. The method of claim 10, further comprising reformatting data into a format appropriate for memory devices of memory modules.

16. A machine-readable medium having stored thereon executable code which causes a machine to perform a method, for routing signals on a memory module, the method comprising:
- determining, by a memory repeater hub coupled to the memory module, whether signals received address a memory device on the memory module;
- routing the signals to a first memory bus on the memory module connected to the memory device if the addressed memory device is on the memory module; and
- routing the signals to a second memory bus that is connected to the memory module, if the addressed memory device is not on the memory module.

17. The machine-readable medium of claim 16, wherein determining whether the signals received address a memory device on the first memory module, comprises:
- reading a first portion of the address information to identify the identity of the memory device;
- reading a second portion of the address information to identify the identity of a memory bus that the memory device is connected to; and
- comparing the identity of the memory device and the identity of the memory bus to memory module information.

18. A machine-readable medium having stored thereon executable code which causes a machine to perform a method, for routing signals to memory modules, the method comprising:
- de-serializing command and address information from the signals;
- determining whether the signals received address a memory device on a first memory module, based on the address information;
- routing the signals to a first memory bus on the first memory module coupled to the memory device, if the addressed memory device is on the first memory module; and
- routing the signals to a second memory bus located on a second memory module that is connected to the first memory module, if the addressed memory device is not located on the first memory module.

19. The machine-readable medium of claim 18, wherein determining whether the signals received address a memory device on the first memory module, comprises:
- reading a first portion of the address information to identify the identity of the memory device;
- reading a second portion of the address information to identify the identity of a memory bus that the memory device is connected to; and
- comparing the identity of the memory device and the identity of the memory bus to memory module information.

20. A machine-readable medium having stored thereon executable code which causes a machine to perform a method, for routing signals to memory having a memory repeater hub, the method comprising:
- determining, by a first memory repeater hub of the first memory module, whether the signals received address a memory device on a first memory module;
- routing the signals to a first memory bus on the first memory module connected to the memory device, if the addressed memory device is on the first memory module; and
- routing the signals to a second memory repeater hub of the second memory module that is connected to the first memory module, if the addressed memory device is not on the first memory module;
- determining, by the second memory repeater hub, whether the signals received address a memory device on the second memory module; and routing the signals to a second memory bus on the second memory module connected to the memory device, if the addressed memory device is on the second memory module.

21. The machine-readable medium of claim 20, wherein the first memory module further comprises a fourth memory bus connected in series with the first memory bus via the first memory repeater hub, and wherein the first and the third memory buses are coupled in parallel with respect to each other.

22. The machine-readable medium of claim 21, wherein the method further comprises:
   determining whether the addressed memory device is on the first or the fourth memory bus;
   routing the signals to the first memory bus if the addressed memory device is on the first memory bus; and
   routing the signals to the fourth memory bus if the addressed memory device is on the fourth memory bus.

* * * * *

UNITED STATES PATENT AND TRADEMARK OFFICE
CERTIFICATE OF CORRECTION

PATENT NO. : 6,477,614 B1
DATED : November 5, 2002
INVENTOR(S) : Leddige et al.

It is certified that error appears in the above-identified patent and that said Letters Patent is hereby corrected as shown below:

Column 4,
Line 55, delete "415", insert -- 315 --.

Column 5,
Line 25, before "electrical", delete "20".

Column 7,
Line 13, before "the first", delete "to".

Column 8,
Line 10, delete "a synchronous", insert -- asynchronous --.

Signed and Sealed this

Twenty-fifth Day of March, 2003

JAMES E. ROGAN
*Director of the United States Patent and Trademark Office*